UNITED STATES PATENT OFFICE.

AUGUSTE FERNBACH, OF PARIS, FRANCE, AND EDWARD HALFORD STRANGE, OF LONDON, ENGLAND.

MANUFACTURE AND PRODUCTION OF A NUTRIENT MEDIUM FOR USE IN FERMENTATION PROCESSES.

1,044,446.     Specification of Letters Patent.     Patented Nov. 12, 1912.

No Drawing. Original application filed September 24, 1912, Serial No. 722,120. Divided and this application filed October 10, 1912. Serial No. 724,989.

*To all whom it may concern:*

Be it known that we, AUGUSTE FERNBACH, a citizen of the Republic of France, of 26 Rue Dutot, Paris, in the Republic of France, D. Sc., bacteriologist, and EDWARD HALFORD STRANGE, a subject of the King of Great Britain and Ireland, of 7 Staple Inn, in the county of London, England, M. Sc., technical research chemist, have invented new and useful Improvements in the Manufacture and Production of a Nutrient Medium for Use in Fermentation Processes, of which the following is a specification.

The present application is a division of our co-pending application, Serial No. 722,120, filed September 24, 1912, for fermentation process for the production of acetone.

The object of our invention is to manufacture a nutrient medium for use in fermentation processes, the said medium enabling fermentation to be carried on in a very economical and efficient manner, and with a good yield. The said medium is made from yeast (such for instance as yeast remaining from processes of fermentation) by mixing it with water and sterilizing it, which can be done by subjecting it to a sufficiently high temperature for some time, and then the mixture is cooled and a ferment of the type of *Tyrothrix tenuis* is added, sterilized air being allowed to have access to the mixture during, or at intervals during, the period of fermentation. At the end of the fermentation it has been found that about ninety per cent. of the nitrogenous matter of the yeast has been converted into a soluble form not precipitated by tannin.

The following is an example of the way in which our invention can be performed, but we do not limit ourselves to this example: 100 pounds of pressed yeast are mixed with 1,000 pounds of water, and the mixture is sterilized by heat, employing a temperature of, say, about 130° centigrade during several hours. The mixture is then cooled, preferably to a temperature of from 30° to 35° centigrade and a ferment of the type *Tyrothrix tenuis* is added, in the presence of sterilized air, care being taken that no other ferment obtains access to the mixture. The mixture is maintained preferably at from 30° to 35° centigrade for from four, to five, weeks, sterilized air being admitted, say at intervals of 24 hours. By the end of the four or five weeks, about ninety per cent. of the nitrogenous content of the mixture is converted into compounds which are not capable of being precipitated by tannin.

What we claim is:

1. The process of preparing a nutrient medium for use in a fermentation process which consists in mixing yeast with water and subjecting the mixture to the action of a ferment of the type of *Tyrothrix tenuis* in the presence of sterilized air.

2. The process of preparing a nutrient medium for use in a fermentation process which consists in mixing yeast with water, sterilizing the mixture, and subjecting the mixture to the action of a ferment of the type of *Tyrothrix tenuis* in the presence of sterilized air.

3. A nutrient medium for fermentation processes, comprising yeast having substantially 90% of its nitrogenous matter converted into a soluble form not precipitable by tannin.

In testimony whereof we have signed our names to this specification in the presence of two subscribing witnesses.

AUGUSTE FERNBACH.
EDWARD HALFORD STRANGE.

Witnesses:
LUCIEN MEMMINGER,
JACK G. BAKER.